Sept. 29, 1942.  M. URICH  2,297,591
VEHICLE SUSPENSION DEVICE
Filed March 21, 1941  3 Sheets-Sheet 1

Inventor
Mike Urich
By Kimmel & Crowell
Attorneys

Sept. 29, 1942.    M. URICH    2,297,591
VEHICLE SUSPENSION DEVICE
Filed March 21, 1941    3 Sheets-Sheet 2
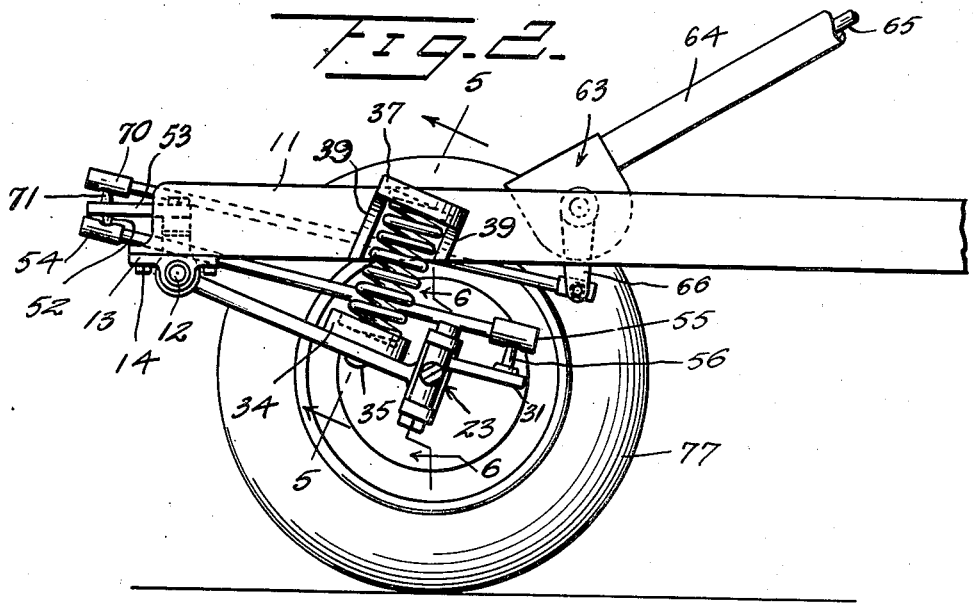
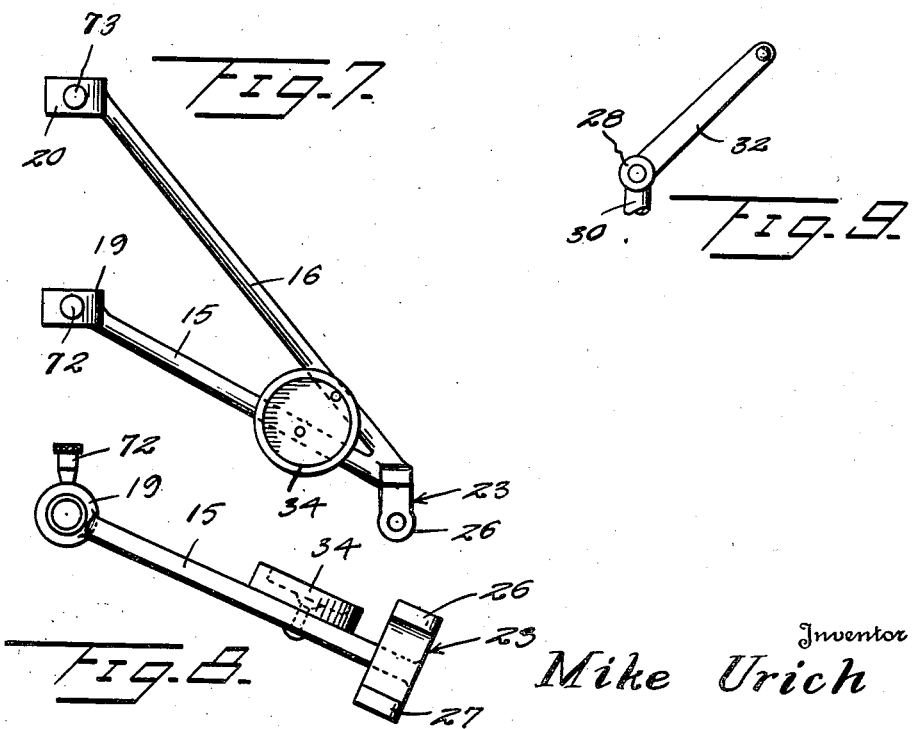
Inventor
Mike Urich
By Kimmel & Crowell
Attorneys Sept. 29, 1942.   M. URICH   2,297,591
VEHICLE SUSPENSION DEVICE
Filed March 21, 1941   3 Sheets-Sheet 3
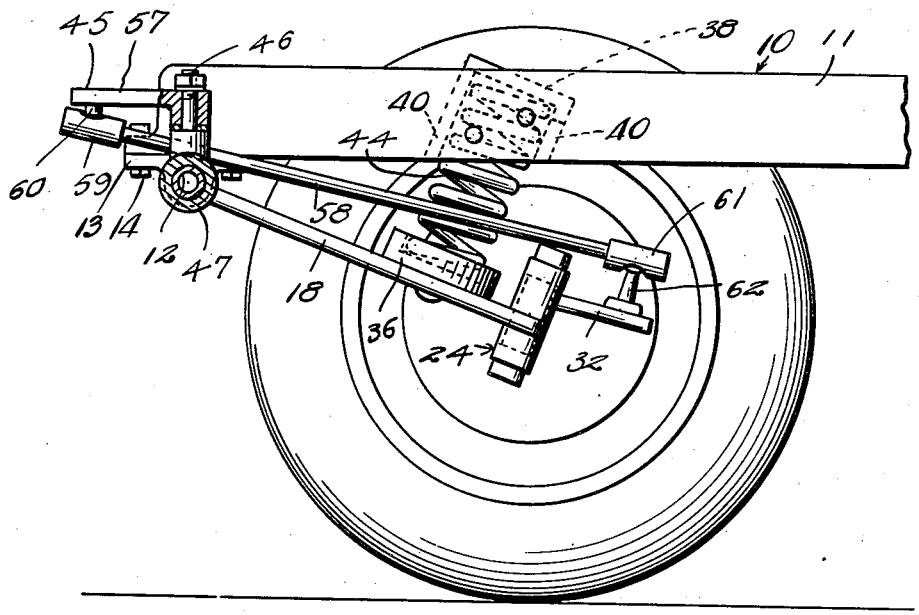
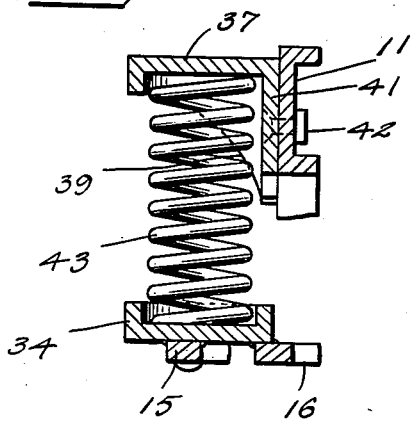
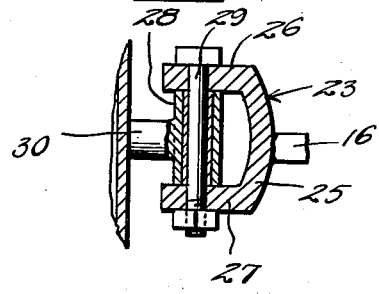
Inventor
Mike Urich
By Kimmel & Crowell
Attorneys Patented Sept. 29, 1942

2,297,591

UNITED STATES PATENT OFFICE 2,297,591

VEHICLE SUSPENSION DEVICE

Mike Urich, Hamilton, Ohio

Application March 21, 1941, Serial No. 384,556

4 Claims. (Cl. 280—96.2)

This invention relates to vehicle suspension devices.

An object of this invention is to provide a suspension means for the front end of a vehicle whereby the front guiding wheels are individually suspended so that they may have independent vertical swinging movement.

Another object of this invention is to provide a suspension means for a vehicle which is of the "knee action" type and an improved steering means associated with the suspension means.

A further object of this invention is to provide a suspension means of this type which is so constructed as to permit the use of helical springs between the vehicle chassis and the suspension means.

A still further object of this invention is to provide a suspension means of this kind in which the wheels are suspended rearwardly from the pivotal mounting therefor and in which the vertical swinging movement thereof is parallel with the line of travel.

A further object of this invention is to provide a swingable vehicle suspension means wherein the upward thrust of the wheel caused by the wheel striking a rut or object in the road is in a direction substantially coplanar with the longitudinal axis of the coil suspension spring.

A further object of this invention is to provide a suspension means of this kind in which the wheels will be kept in proper alignment at all times and the vertical rocking of the wheels will be in a vertical or straight line.

To the foregoing objects and to others which may hereinafter appear, the invention consists of the novel construction, combination and arrangement of parts as will be more specifically referred to and illustrated in the accompanying drawings wherein are shown embodiments of the invention, but it is to be understood that changes, variations and modifications may be resorted to which fall within the scope of the invention as claimed.

In the drawings:

Figure 2 is a detail side elevation partly in section of the device.

Figure 3 is a sectional view taken on the line 3—3 of Fig. 1.

Figure 5 is a sectional view taken on the line 5—5 of Figure 2.

Figure 6 is a sectional view taken on the line 6—6 of Figure 2.

Figure 7 is a plan view of one of the pair of suspension devices removed from the vehicle.

Figure 8 is a detail side elevation of the device shown in Figure 7.

Figure 9 is a fragmentary plan view of the steering knuckle or arm associated with this device.

Figure 1:
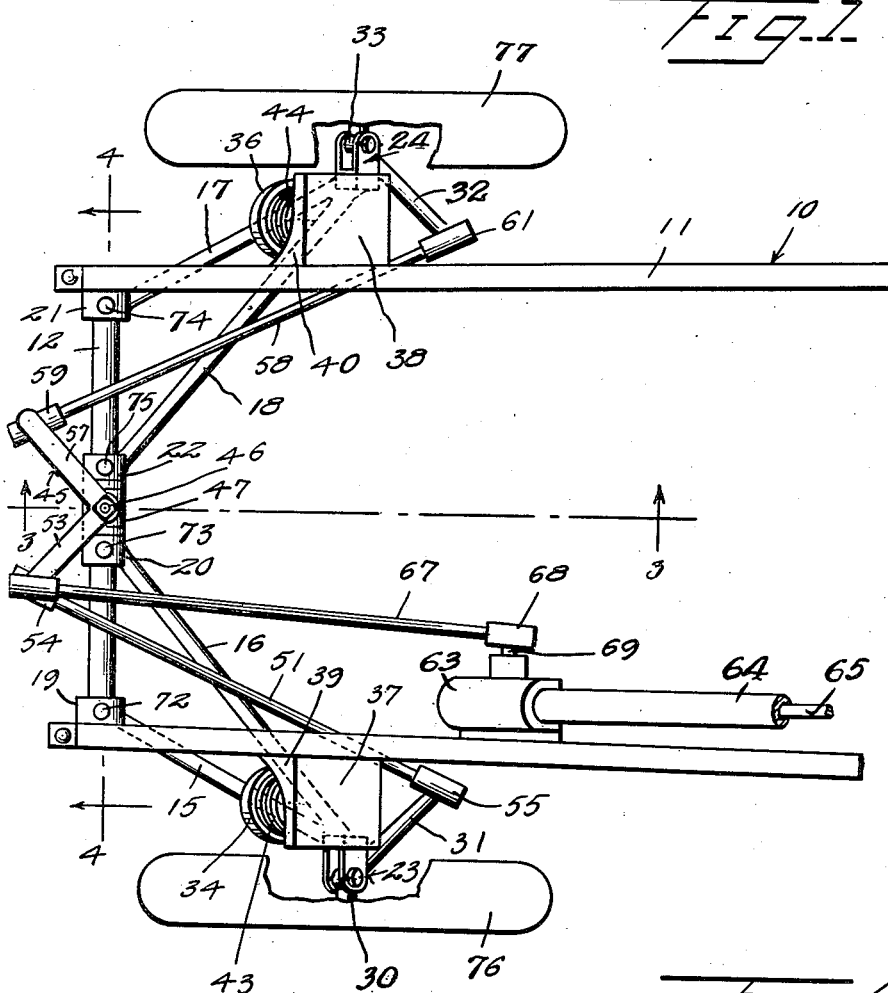
Figure 1 is a detail top plan of a vehicle suspension device constructed according to an embodiment of this invention and mounted on a vehicle frame which is shown in fragmentary form.
Figure 4:
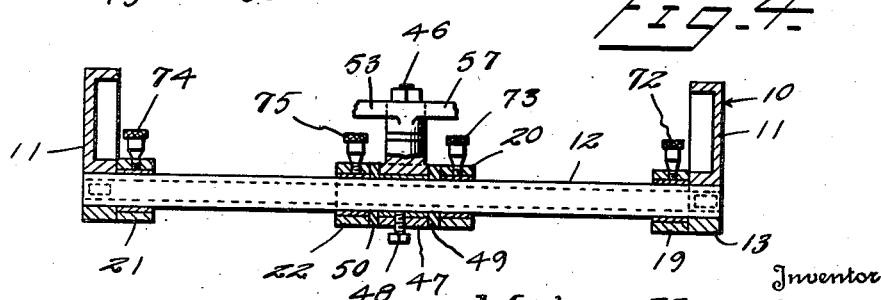
Figure 4 is a sectional view taken on the line 4—4 of Figure 1.

Referring to the drawings, the numeral 10 designates generally a vehicle frame structure which as shown in Figure 4, is formed of a pair of channel members 11. A transversely disposed stationary bar or shaft 12 extends between the forward ends of the channel members 11 and is secured at the opposite ends thereof to the channel members 11 by clamping members 13, which are fixed to the channel members 11 by fastening devices 14.

A pair of swingable vehicle suspending arms 15 and 16 extend rearwardly from the transverse bar or shaft 12 and a second pair of wheel or vehicle suspending arms 17 and 18 also extend rearwardly from the shaft or bar 12. The said pairs of arms are oppositely disposed. Each pair of arms extend rearwardly at an outwardly inclination with respect to a channel member 11. The arms of each pair are disposed in rearwardly converging relation from their forward ends. The rear ends of the arms of each pair merge into each other. The merged ends of the arms of each pair are arranged outwardly of a channel member 11. The arm 15 is substantially shorter in length than the arm 16 and the arm 17 is substantially shorter in length than the arm 18. The arm 15 at its forward end is provided with a cylindrical bushing 19 which rotatably engages the bar or shaft 12 and the arm 16 at its forward end has a cylindrical bushing or bearing 20 fixed thereto and rotatably engaging the bar or shaft 12.

The arm 17 at its forward end has fixed thereto a cylindrical bushing or bearing 21, which rotatably or rockably engages the bar or shaft 12 and the arm 18 at its forward end has fixed thereto a cylindrical bushing or bearing 22, which also rockably or rotatably engages the bar or shaft 12. The outer end of the bushing 19 engages against the adjacent clamping or attaching member 13 and in like manner the outer end of the bushing or bearing 21 engages against the adjacent clamping or attaching member 13 so that the arms 15 and 17 are thereby held against outward endwise movement.

The pair of vehicle suspending arms 15 and 16 are fixed together at their rear or convergent ends and are also fixed at such convergent ends to a spindle fork generally designated as 23. The rear ends of the vehicle suspending arms 17 and 18 are fixed together, at their convergent ends and such ends are secured to a spindle fork generally designated as 24. The two forks 23 and 24 are of like construction, being shown in more detail in Figure 6 and each fork comprises a vertically disposed arcuate member 25, which is provided at the upper and lower ends thereof with a pair of bearing members 26 and 27, respectively. A spindle bearing 28 engages between the bearing members 26 and 27 and is held therebetween by means of a king pin or bolt 29, which engages through the two bearing members 26 and 27 and also through the vertical spindle bearing 28.

A wheel spindle 30 is fixed to the spindle bearing 28 and extends horizontally outwardly therefrom. An inwardly and rearwardly inwardly inclined steering arm 31 is fixed to the bearing or sleeve 28, of fork 23 and extends inwardly in the direction of the adjacent frame member 11. A second steering arm 32 is fixed to the spindle structure 33 associated with the spindle fork 24 and is inclined inwardly and rearwardly in the direction of the adjacent frame member 11.

A cup-shaped spring retaining member 34 is fixed as by fastening devices 35 to the upper sides of the vehicle suspension arms 15 and 16 adjacent the rear convergent ends thereof and a second cup-shaped spring retaining member 36 is fixed to the vehicle suspension arms 17 and 18 adjacent the rear convergent ends thereof. An inverted stationary cup-shaped spring retaining member 37 is disposed in confronting relation to the retaining member 34 and an inverted cup-shaped retaining member 38 is disposed in confronting relation to the retaining member 36. The retaining member 37 is fixed to the adjacent frame member 11 by supporting members 39, which also comprise bracing members for bracing the upper cup-shaped member 37 and in like manner the inverted retaining member 38 is supported from and fixed to the adjacent frame member 11 by combined supporting and bracing members 40. The members 34, 36, 37, 38, incline downwardly from front to rear. The bracing members 39 and 40 may be formed integral with the retaining members 37 and 38 and a vertically disposed plate 41 may also be formed integral with the retaining members and may be secured as by fastening devices 42 to the channel members 11. A spring 43 engages at one end in the retaining member 34 and a second spring 44 engages at one end in the retaining member 36. The opposite or upper end of the spring 43 engages in the retaining member 37 and the opposite or upper end of the spring 44 engages in the retaining member 38. The springs 43, 44 incline rearwardly from this lower to their upper ends.

A bell crank 45 is disposed above the stationary shaft 12 and is pivotally mounted on a vertically disposed shouldered stud 46. The stud 46 is carried by a cylindrical bushing 47 which is fixed as by a set screw 48 to the stationary shaft 12 between the two bushings 20 and 22. A pair of washers or thrust members 49 and 50 are disposed between the abutting ends of the bushings, 20, 47 and 22. A tie rod 51 is pivotally connected at its forward end to a pivot member 52, which is carried by one arm 53 of the bell crank 45 and which extends downwardly therefrom. The pivotal mounting 52 is preferably constructed in the form of a ball which engages in a socket member 54 carried by the forward end of the tie rod 51. A second socket 55 is carried by the rear end of the tie rod 51 and has mounted therein a pivot member 56 fixed to the upper side of a steering arm 31 in the form of a ball or the like.

The other arm 57 of the bell crank 45 is connected with the steering arm 32 by means of a tie rod 58. The tie rod 58 is provided with a socket 59 at its forward end which engages a pivot member 60 in the form of a ball or the like depending from the lever arm 57. The rear end of the tie rod 58 is provided with a socket 61 engaging a pivot member 62 in the form of a ball which is fixed to the steering arm 32 on the upper side thereof.

A steering mechanism generally designated as 63 is fixed to one of the frame members 11 on the inner side thereof and has an upwardly and rearwardly inclined steering column 64 extending therefrom in which a steering shaft 65 rotatably engages. A depending steering lever 66 is operatively connected with the steering shaft 65, the mechanism disposed within the housing formed by the steering member 63 being of conventional construction. A steering link 67 is provided at its rear end with a socket 68 engaging a pivot member 69, which is carried by the lower end of the steering lever 66. The forward end of the link 67 has mounted thereon a socket 70 in which an upstanding pivot member 71 in the form of a ball or the like engages, the ball 71 being in the present instance carried by the bell crank arm 53 on the upper side thereof.

The bushings 19 and 20 are provided with lubricating fittings 72 and 73, respectively, and the bushings 21 and 22 are also provided with lubricating fittings 74 and 75, respectively.

In the use and operation of this vehicle suspension means, the wheels 76 and 77 are rotatably carried by the spindle members 30 and 33 and in normal operation, the springs 43 and 44 will be under compression due to the weight of the vehicle. The suspension arms 15 and 16 are adapted to vertically rock under vertical movement of the wheel 76, the vertical rocking movement being effected by the rocking of the forward ends of the arms 15 and 16 on the shaft 12, which is disposed at right angles to the line of travel of the vehicle. The suspension arms 15 and 16 and in like manner the suspension arms 17 and 18 comprise draft arms which trail from the stationary shaft 12 so that in normal operation of the vehicle in a forward direction, the suspension arms will be under a pulling strain rather than a pushing strain. The inner arms 16 and 18 of each of the suspension members comprise bracing arms which are adapted to prevent the inward shifting of the wheels 76 and 77 with respect to the frame 10.

The suspension means hereinbefore described is of relatively simple construction so that it can be manufactured at a relatively small cost and due to the simplicity of its construction, it will not readily get out of order and may be readily taken apart when such operation is necessary for repair or replacement of any component part thereof.

With a suspension structure as hereinbefore described, the upward force on the wheels caused by the wheels striking ruts or projections in the roadway is in substantially the same plane as the longitudinal axes of the springs 43 and 44. Furthermore, the wheels will be kept in constant alignment due to the rocking of the suspension arms about a horizontal axis.

What I claim is:

1. In a vehicle suspension means for a vehicle frame, a stationary shaft, means for mounting said shaft at the front end of the frame, two pairs of rearwardly extending oppositely disposed outwardly and downwardly inclined supporting members for the front wheels of the vehicle, the arms of each pair being rearwardly convergent, merging into each other at their rear ends and having such ends disposed outwardly with respect to sides of the frame, a bushing carried by the front end of each of said arms rockably mounted on said shaft, a spindle fork disposed outwardly in relation to a side of the frame and fixed to the merged convergent rear ends of the arms of a pair, a lower cup-shaped spring retaining element fixed to the upper face of each pair of arms forwardly of the merged rear ends of the latter and disposed outwardly in relation to a side of the frame, an upper inverted cupshaped spring retaining member arranged over each of said elements, means securing said upper members to the outer faces of the sides of the frame, and a pair of helical springs each mounted at one end in one of said elements and at its other end in one of said members.

2. In a vehicle suspension means for a vehicle frame, a stationary shaft, means for mounting said shaft at the front end of the frame, two pairs of rearwardly extending oppositely disposed outwardly and downwardly inclined supporting members for the front wheels of the vehicle, the arms of each pair being rearwardly convergent, merging into each other at their rear ends and each having such ends thereof disposed outwardly with respect to a side of the frame, a bushing carried by the front end of each of said arms, rockably mounted on said shaft, a spindle fork disposed outwardly in relation to a side of the frame and fixed to the merged convergent rear ends of the arms of a pair, a lower cup-shaped spring retaining element fixed to the upper rear ends of the latter and disposed outwardly in relation to a side of the frame, an upper inverted cup-shaped spring retaining member arranged over each of said elements, means for securing said members to outer faces of the sides of the frame, and a pair of helical springs each mounted at one end in one of said elements and at the other end in one of said members, said elements being disposed at a downwardly inclination from front to rear, said members being disposed at a downward inclination from front to rear and aligning with said elements, and said springs inclining rearwardly from their lower to their upper ends.

3. In a vehicle suspension means for a vehicle frame, a stationary shaft, means for mounting said shaft at the front end of the frame, two pairs of rearwardly extending oppositely disposed outwardly and downwardly inclined supporting members for the front wheels of the vehicle, the arms of each pair being rearwardly convergent, merging into each other at their rear ends and each pair having such ends thereof disposed outwardly with respect to a side of the frame, a bushing carried by the front end of each of said arms, rockably mounted on said shaft, a spindle fork disposed outwardly in relation to a side of the frame and fixed to the merged convergent rear ends of the arms of a pair, a lower cup-shaped spring retaining element fixed to the upper face of each pair of arms forwardly of the merged rear ends of the latter and disposed outwardly in relation to a side of the frame, an upper inverted cup-shaped spring retaining member arranged over each of said elements, means securing said members to outer faces of the sides of the frame, a pair of helical springs each mounted at one end in one of said elements and at its other end in one of said members, a bell crank, means for pivotally mounting said bell crank upon said shaft between the pairs of supporting arms, a pair of spindles, each pivotally connected to a fork, a pair of oppositely disposed inwardly extending rearwardly inclined steering arms each having its forward end connected to a spindle, a pair of oppositely disposed forwardly extending tie rods inclining inwardly from rear to front, pivotally connected at their rear ends to the rear ends of said steering arms and pivotally connected at their forward ends to the divergent arms of said bell crank, a steering lever, and a link connecting the steering lever to one of the arms of the bell crank.

4. In a vehicle suspension means for a vehicle frame, a pair of spaced oppositely disposed outwardly inclined substantially V-shaped supporting members converging rearwardly, downwardly and outwardly inclined from front to rear and having their rear portions disposed in outward relation with respect to the sides of the frame, a transversely disposed shaft fixed to said frame at the forward end of the latter, means for pivotally mounting the divergent end of each of said members on said shaft, a fork fixed to the convergent end of each of said members for pivotally supporting a wheel spindle, a pair of lower cup-shaped spring retainers each fixed upon a supporting member forwardly of the rear end of the latter, a pair of upper inverted cup-shaped spring retainers each arranged over and aligned with one of the other retainers and fixed to a side of the frame, a pair of helical springs interposed between a lower and an upper retainer and having its ends seating in such retainers, the said retainers being inclined downwardly from front to rear, said springs being inclined rearwardly from their upper ends, a bell crank pivotally mounted on said shaft and adapted to have one of its arms pivotally connected to a steering mechanism carried by the frame, steering arms adapted to be connected to the spindles and tie rods pivotally connected to said steering arms and pivotally connected to the arms of said bell crank.

MIKE URICH.